(12) United States Patent
Ghazal et al.

(10) Patent No.: US 9,146,960 B2
(45) Date of Patent: Sep. 29, 2015

(54) ADAPTIVE OPTIMIZATION OF ITERATIVE OR RECURSIVE QUERY EXECUTION BY DATABASE SYSTEMS

(71) Applicant: Teradata Corporation, Dayton, OH (US)

(72) Inventors: Ahmad Said Ghazal, Redondo Beach, CA (US); Dawit Seid, Cary, NC (US)

(73) Assignee: Teradata US, Inc., Dayton, OH (US)

( * ) Notice: Subject to any disclaimer, the term of this patent is extended or adjusted under 35 U.S.C. 154(b) by 23 days.

(21) Appl. No.: 13/722,068

(22) Filed: Dec. 20, 2012

(65) Prior Publication Data

US 2014/0181079 A1     Jun. 26, 2014

(51) Int. Cl.
*G06F 17/30* (2006.01)

(52) U.S. Cl.
CPC .... *G06F 17/30469* (2013.01); *G06F 17/30451* (2013.01)

(58) Field of Classification Search
CPC .................................................. G06F 17/30469
USPC ........................................................ 707/718
See application file for complete search history.

(56) References Cited

U.S. PATENT DOCUMENTS

| 5,752,241 A | 5/1998 | Cohen |
| 2005/0120000 A1* | 6/2005 | Ziauddin et al. ................. 707/3 |

OTHER PUBLICATIONS

Ghazal, Ahmad, Alain Crolotte, and Dawit Seid. "Recursive sql query optimization with k-iteration lookahead." Database and Expert Systems Applications. Springer Berlin Heidelberg, 2006.*
Derr, Marcia A. "Adaptive query optimization in a deductive database system." Proceedings of the second international conference on Information and knowledge management. ACM, 1993.*
"Query Size Estimation by Adaptive Sampling", Journal of Computer and System Sciences, 51 (1), 18-25, 1995, by R.J Lipton.
"Size-Estimation Framework With Applications to Transitive Closure and Reachability", Journal of Computer and System Sciences, vol. 55, pp. 441-453, Dec. 1997 by Edith Cohen.

* cited by examiner

*Primary Examiner* — William Spieler
(74) *Attorney, Agent, or Firm* — Ramin Mahboubian

(57) ABSTRACT

Based on one or more predicated results (e.g., estimations of the actual results) associated with one or more iterations and/or sub-queries of an iterative or recursive database query, it can be determined whether to use an execution plan (e.g., a current execution plan used to execute one or more iterations) to execute one or more other iterations and/or sub-queries of the iterative or recursive database query. Consequently, use of the execution plan to execute the one or more other iterations and/or sub-queries of the iterative or recursive database query can be disallowed. As a result, the iterative or recursive database query can be executed more efficiently. The determination of whether to use an execution plan can, for example, be performed by determining whether an actual result obtained by executing one or more iterations differs or diverges more than a determined value from an estimated result of the same iteration(s).

10 Claims, 5 Drawing Sheets

```
CREATE RECURSIVE VIEW all_trips (source, destination) AS SELECT  dep_city,
arr_city FROM Flights
   UNION ALL
SELECT   results_before.source,   next_leg.arr_city
FROM  all_trips results_before,   Flights next_leg
WHERE reults_before.destination=next_leg.dep_city;
```

FIG. 1

*Procedure ExecuteAllTrips*

*Begin*

1. *Retrieve from Flights table into Spool¹ 1 and Spool 2.*
2. *Join Flights with Spool 2.*
3. *If join result is empty go to step 7.*
4. *Empty Spool 2 and then set it to the join result.*
5. *Spool 1 = Spool 1 UNION join result.*
6. *Go to step 2.*
7. *Final result = Spool 1*
   *End*

FIG. 2

```
CREATE RECURSIVE VIEW all_trips (source, destination)
AS
SELECT  dep_city, arr_city FROM Flights as B
  UNION ALL
SELECT S_i.source,   B.arr_city
FROM  all_trips S_i,   Flights B
WHERE S_i.destination=B.dep_city;
```

FIG. 4

ADAPTIVE OPTIMIZATION OF ITERATIVE OR RECURSIVE QUERY EXECUTION BY DATABASE SYSTEMS

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on. The term database can also refer to a collection of data and/or data structures typically stored in a digital form. Data can be stored in a database for various reasons and to serve various entities or "users." Generally, data stored in the database can be used by one or more the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

As those skilled in the art readily appreciate, generally, optimization of database queries presents many challenges. In particular, optimization of iterative (or recursive) database queries (RQ's) poses more serious and difficult challenges, where a database query has to be computed as a series of iterations (or iterative operations) where the result of a first iteration is needed to compute the result of second iteration, and so on. It should be noted that queries requiring such iterative steps are also known, for example, as recursive queries in the context of the ANSI standard as generally known in the art.

In view of the foregoing, it should be noted that techniques for optimization of iterative queries (e.g., recursive queries of the ANSI standard) of database systems and environments are highly useful.

SUMMARY

Broadly speaking, the invention relates to computing environments and systems. More particularly, the invention relates to techniques for optimization of the execution of database queries in database systems.

In accordance with one aspect of the invention, based on one or more predicated results (e.g., estimations of the actual results) associated with one or more iterations and/or subqueries of an iterative or recursive database query, it can be determined whether to use an execution plan (e.g., a current execution plan used to execute one or more iterations) to execute one or more other iterations and/or sub-queries of the iterative or recursive database query. Consequently, use of the execution plan to execute the one or more other iterations and/or sub-queries of the iterative or recursive database query can be disallowed. As a result, the iterative or recursive database query can be executed more efficiently.

The determination of whether to use an execution plan can, for example, be performed by determining whether an actual result obtained by executing one or more iterations differs or diverges more than a determined value from an estimated result of the same iteration(s) in accordance with one embodiment of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1 depicts a very simplified example of an iterative query as a "Recursive View all-trips" designed to obtain all flights between source and destinations cities.

FIG. 2 depicts a very simplified procedure "ExecuteAll-Trips" to demonstrate a highly simplified implementation of executing the "Recursive View all-trips" shown in FIG. 1.

FIG. 4 depicts equi-join cardinality over the two columns of a base relation.

DETAILED DESCRIPTION

Figure 3:
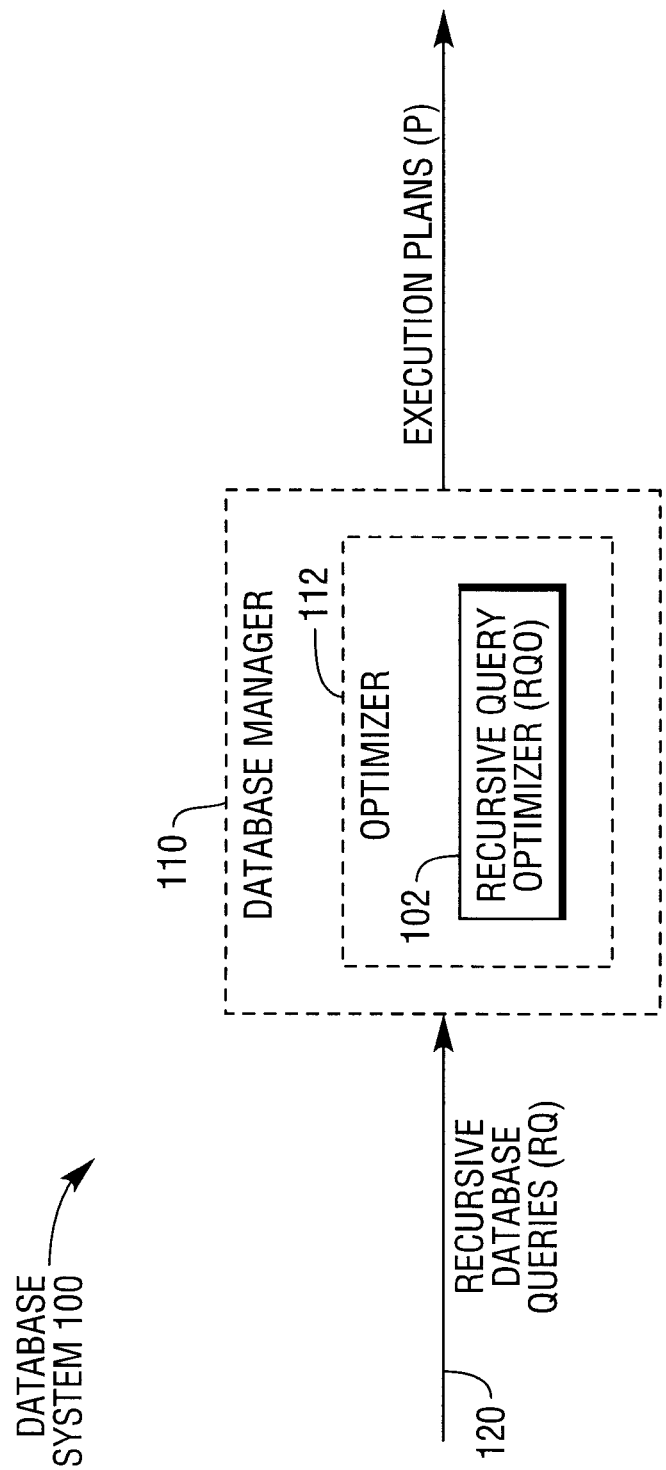
FIG. 3 depicts a database system that includes a Recursive Query Optimizer (RQO) in accordance with one embodiment of the invention.

As noted in the background section, techniques for optimization of iterative queries (e.g., recursive queries of the ANSI standard) of database systems and environments are highly useful. However, optimization of iterative queries poses even more difficult challenges partly because the result of an iteration (or sub-query) is dependent on a previous iteration (or previous sub-query) preceding it, but the same execution plans may not be optimal for executing both of the iterations (or sub-queries). In other words, different iterations may exhibit different cardinalities (results or result sizes, including intermediate results or sizes) and therefore require different optimal execution plans for executing each one of the iterations. However, conventionally, execution plans are determined statically, where an optimal plan is determined for the first iteration and followed for the proceeding iterations despite the suitability of the plan. In other words, cardinalities of the proceeding iterations are not considered in static query optimization techniques.

To further elaborate, FIG. 1 depicts a very simplified example of an iterative query as a "Recursive View all-trips" designed to obtain all flights between source and destinations cities. As this example shows, multiple iterative sub-queries are required in a table of flights with at least a source and destination entries between two cities with a direct flight, where the first source (e.g., San Diego) would give a first destination (e.g., Las Vegas) in a first iteration (or first sub-query), and wherein in a second iteration (or second sub-query) estimated or predicted on the first iteration, the first destination would become a second source (e.g., Las Vegas) to compute a second destination (e.g., Detroit), and so on. Although this simple example may not be fully illustrative, an ordinary person may better understand the problems associated with iterative database queries in noting that a second iteration may have significantly different characteristics as the number of outgoing flights from San Diego could widely differ from Las Vegas or New York, and so on.

FIG. 2 depicts a very simplified procedure "ExecuteAll-Trips" to demonstrate a highly simplified implementation of executing the "Recursive View all-trips" shown in FIG. 1. Referring to FIG. 2, the steps 1-7 can, for example, be generated by an optimizer and executed by what may be called an "execution engine" as generally known in the art. The first step corresponds to performing a seed part (first SELECT). It can produce an initial result and feed it into the recursion or recursive steps 2-6. In the context, Spool 2 can be used to hold a "running seed" (or the recursive result of each iteration) which can then become part of a cumulative result held in spool 1. The final result can be represented as a "UNION" of the initial seed and the running seeds as those skilled in the art will readily appreciate.

In the example shown in FIG. 2, simply put, an optimizer would need to find the best way to perform the seed and recursive steps based on cost estimates. For example, in step 1, the optimizer may find an index access to the Flights stored in a Flights table. In step 1, the optimizer may also finds the best join method to join the Flights (or join the Flights table with itself) with Spool 2. Of course, for a practical application, and in particular for relatively more complex queries, the join plan for Step 2 can be very highly involved than the example shown in FIG. 2 would suggest.

Using the example of FIG. 2, it should be noted that conventionally a static plan in step 2 is determined based on the estimated cardinalities (i.e. cardinality statistics) of Spool 2 computed once and when the execution plan is first created. These statistics can basically be the outcome of the seed step (step 1) in the example shown in FIG. 2. Hence, the execution plan can be optimal for the first iteration of the recursive execution but may not be optimal for the subsequent iterations. One reason for this is that cardinality statistics of Spool 2 may change very significantly during the recursive execution rendering the initial plan non-optimal. For example, as the cardinality of Spool 2 changes from iteration i to iteration i+1, it is possible that "hash join" is determined to be the optimal way to join Flights to Spool 2 in i-th iteration but "merge join" could be the optimal way to do the join at the i+1th iteration.

In one approach, cardinality statistics can be collected and provided as feedback to address the inefficiency of the static planning schemes. In other words, after completion of an iteration of a recursive query, actual statistics can be taken and used in order to plan or re-plan the execution of the next iteration. This feedback process can be repeated at each iteration until all iterations of the recursive query have been completed in order to address the problem of static planning schemes where the same execution plan is used for all of the iterations. However, at least in some systems, including parallel systems (e.g., DBMS of a Teradata system) such full feedback solution may not be optimal as providing feedback at each iteration and re-planning can interrupt execution and the pipelining across iterations. Also, global query optimizations (for steps of different iterations), where common components of multiple execution plans are isolated and executed only once to avoid redundant repetition, may not be possible with a technique using feedback at each iteration (full feedback) given that the execution plans may not be known up-front In view of the foregoing, improved techniques for generating plans for execution of recursive database queries are needed and would be very useful.

In view of the foregoing, improved techniques for generating execution plans for execution of recursive database queries are needed and would be very useful.

Accordingly, it will be appreciated that based on one or more predicated results (e.g., estimations of the actual results) associated with one or more iterations and/or sub-queries of an iterative or recursive database query, it can be determined whether to use an execution plan (e.g., a current execution plan) to execute one or more other iterations and/or sub-queries of the iterative or recursive database query, in accordance with one aspect of the invention. Consequently, use of the execution plan to execute the one or more other iterations and/or sub-queries of the iterative or recursive database query can be disallowed. As a result, the iterative or recursive database query can be executed more efficiently.

The determination of whether to use an execution plan can, for example, be performed by determining whether an actual result obtained by executing one or more iterations differs or diverges more than a determined value from an estimated result of the same iteration(s) in accordance with one embodiment of the invention.

Embodiments of these aspects of the invention are also discussed below with reference to FIGS. 3-7. However, those skilled in the art will readily appreciate that the detailed description given herein with respect to these figures is for explanatory purposes as the invention extends beyond these limited embodiments.

FIG. 3 depicts a database system 100 that includes a Recursive Query Optimizer (RQO) 102 in accordance with one embodiment of the invention. As suggested by FIG. 3, the database system 100 may also include a database manager 110 (e.g., Database Management System (DBMS), a Relational Database Management System (RDBMS)) that effectively manages a database 101. As such, RQO 102 can, for example, be provided as a part of the database manager 110. More particularly, it will be appreciated that the RQO 102 can, for example, be provided as a part of an optimizer 112 in the database manager 110. Of course, the RQO 102 can be provided as a separate component. Furthermore, it is not necessary to use a database manager 110 and/or optimizer 112 as RQO 102 can be configured and can operate independently and separately as those skilled in the art will also readily appreciate.

Those skilled in the art will also readily appreciate that RQO 102 can be implemented at least partly as a computer executable program and/or as a hardware component. For example, RQO 102 can be provided as executable computer code stored in memory (not shown) and executed by one or more processors (not shown).

In any case, RQO 102 can effectively determine whether to use or not use an execution plan 122 for execution of a recursive database query 120. Typically, a recursive database query 120 requires multiple sub-queries to be executed as multiple iterations such that a result of a first one of the sub-queries is needed to be determined in a first iteration of the iterations of the recursive database query 120 in order to determine the result of a second one of the sub-quires in a second iteration to be performed after the first iteration. As such, RQO can effectively decide whether it is optimal to use the execution plan 122 at a given iteration of the recursive database query 120. By way of example, the execution plan 122 may have been provided for execution of the recursive database query 120, but after the first iteration of the recursive database query 120 has been executed using the execution plan 122, RQO can determine that the execution plan 122 is not optimal and should not be used. As a result, remedial action can be taken. For example, feedback can be used to generate an alternative execution plan based on the actual result of the first iteration, or a second plan that may already be available can be used to execute the second iteration.

Conceptually, at a given iteration of the recursive query 120, RQO 102 can determine whether to use the execution plan 122 and output an indication 114 that indicates whether to use the execution plan 122 at that iteration or not. It will be appreciated that RQO 102 can make this determination at least partly based on a predicated result of a previous iteration of the recursive query 120. In other words, a predication of the result of an iteration (e.g., first iteration) can be used by the RQO 102 to determine whether to continue to use the same plan (i.e., execution plan 122) to execute the next one or more iterations (e.g., second iteration, third iteration) of the recursive query 120.

By way of example, an estimation, or a prediction regarding the result of execution of an iteration of the recursive query 120 pertains to the size or number of rows in one or more database tables involved in the recursive query 120. The same predication can be the basis for generating the execution plan 122 as an optimal plan for execution of the recursive query 120. After the first iteration of the recursive query 120 has been executed using the execution plan 122 based on the estimated or predicted result, RQO 102 can compare the actual result with the predicated result of the iteration. Consequently, the RQO 102 can, for example, determine whether the actual result with the predicated result of the iteration are within a determined acceptable range and provide the indication 114 as output to indicate whether to use or not use the execution plan 122 for the next iteration of the recursive query 120.

In other words, RQO 102 determining whether an actual result of first sub-queries (of the recursive query 120) obtained by executing the first iteration differs or diverges more than a determined value from the actual result of first one of the sub-queries obtained after execution of the first iteration. As will be discussed in greater detail, the predicated result of first one of the sub-queries can, for example, be determined based on, an estimated or a predicted seed selectivity, of the first sub-query that represents a ratio of rows that a join with at least one table of the database (or database table) would produce given a first iteration seed provided as input of the first sub-query. The estimated or predicted seed selectivity of the first sub-query can, for example be determined by dividing the number of unique values in one or more recursive join conditions of the database query, by the total number of rows in one or more tables involved in at least one recursive join of the first iteration.

Generally, propagation of join estimation errors across or over the iterations of a recursive query can be addressed by using a passive monitoring scheme to collect feedback and trigger re-planning of the execution plan. For illustration, a case where statistics based on a prior iteration turns out to be invalid with respect to the current iteration's execution plan can be considered.

For example, referring to FIG. 4, consider the equi-join cardinality over the two columns, c1 and c2, of the base relation B (irrespective of the seed). Referring to FIG. 4, B (c1,c2) can denote a base table with columns c1 and c2 that are self-join compatible, $S\_0$ (c1,c2) can denote a seed representing initial records, and $S\_0.c2=A.c1$ can denote the recursive join condition. Although an equijoin is used in this example, it should be noted that this join can be virtually any valid join expression. Referring again to FIG. 4, Let S_1, S_2, S_3, . . . denote the recursive results at self-join iterations 1, 2, 3 . . . , which are unioned to produce the result. In other words, S_1={result of join S_0.c2=B.c1}, S_2={result of join S_1.c2=A.c1}, and so on.

As noted above, generating an optimal query plan for queries exemplified in FIG. 4 poses a difficult challenge because the demographics (statistics) that are used for generating a join plan at the initial iteration may not remain valid in subsequent iterations.

Now consider a situation where collected statistics or feedback based on demographics turns out to be invalid with respect to the query execution. More particularly, referring to FIG. 4 again, consider the equi-join cardinality over the two columns, c1 and c2, of the base relation B (irrespective of the seed). It should be noted that if the join selectivity averages over a join distribution that is close to uniform, then statistics or feedback will not be needed since the cardinality of S_i, at any iteration i, will be close to the expected (estimated) size and the plan of the first iteration will continue to be valid. However, if the join selectivity averages over a join distribution that is skewed, then the cardinality of S_i can vary at least significantly or even greatly across iterations. This, in turn, can cause the optimal join plan to vary across iterations.

Hence, it will be appreciated that a metric can be provided to detect when a join plan can vary across iterations so that statistics can be provided as feedback to re-plan the execution plan for executing one or more iterations of a recursive query in accordance with one aspect of the invention. In effect, a passive monitoring scheme can collect statistics, perhaps at each and every iteration, but the execution of the query can be interrupted to provide the statics and re-plan the execution, only when it is deemed necessary to do so (e.g., when the projected result size estimates deviate more than an acceptable range from the actual statistics that can be provided as feedback for planning or re-planning the execution plan for one or more iterations of a recursive query). As a result, shortcomings of static plans that use only a single plan for all of the iterations and full-feedback techniques that interrupt each and every iteration can be addressed because unnecessary re-planning and interruptions can be avoided.

In order to determine when to trigger a re-plan, a divergence metric can be defined and provided in accordance with one embodiment of the invention. The divergence metric can, for example, measure the performance of the current demographics at a particular iteration of recursive query.

Figure 6:
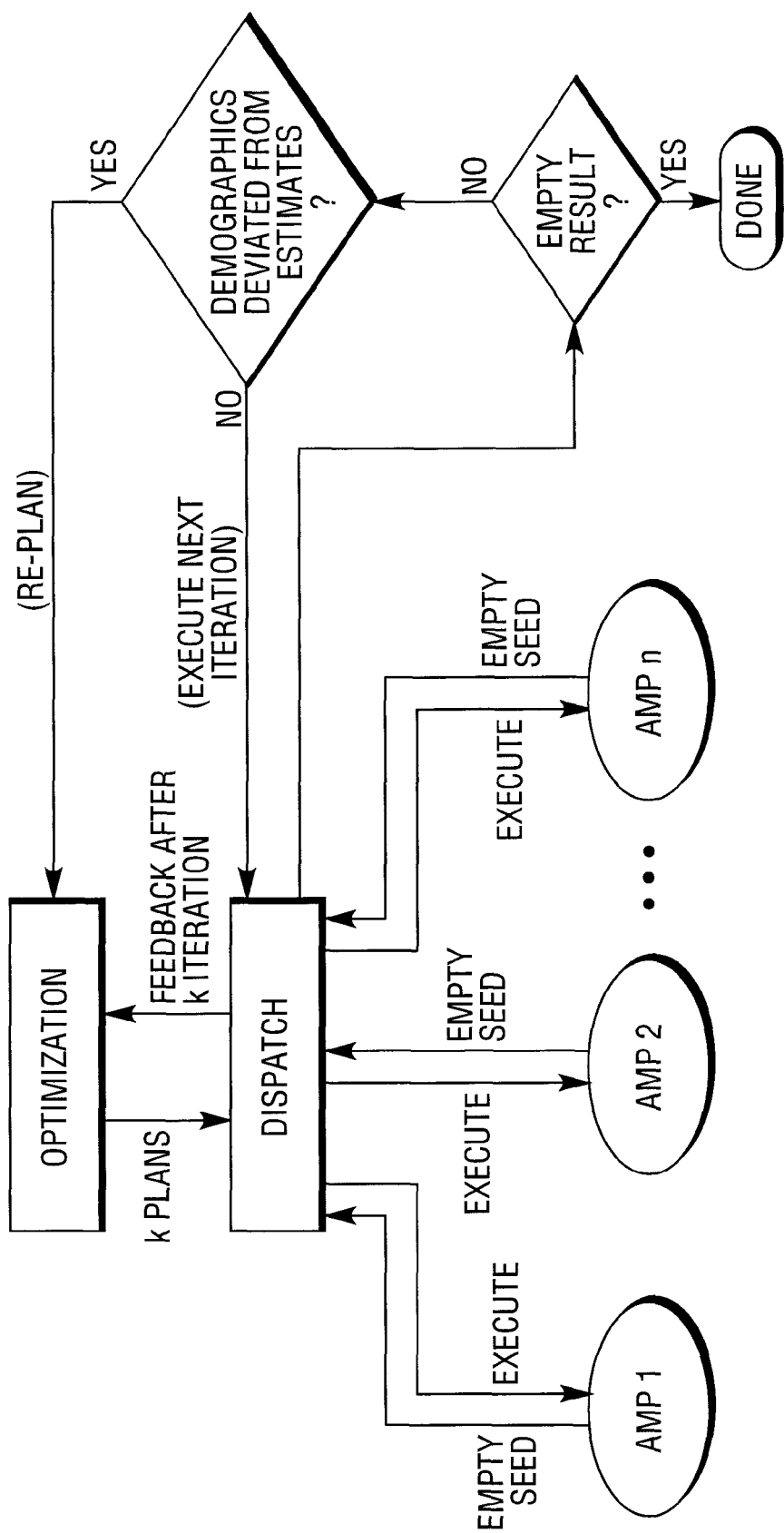
FIG. 6 depicts a multiprocessor database system in accordance with one embodiment of the invention.

FIG. 6 depicts a multiprocessor database system in accordance with one embodiment of the invention. First, referring to FIG. 6, it should be noted that at least one of the relations in the recursive joins, namely the base table, can remain the same in all iterations of the recursive query. Also, the only components that can vary can be the seeds generated at different iterations. Hence, as a proxy to the impact of these variations in the join estimates, a notion of seed selectivity estimation at a given iteration can be defined for the respective seed denoted as S_i in accordance with one embodiment of the invention as follows:

$$\text{seed selectivity of S\_i} = \frac{\text{Number of unique values in } S_i's \text{ join column}}{\text{Number of rows in S\_i}}$$

Basically, a seed selectivity can represents the fraction of rows that a join with the base table will produce for a distinct value of the iteration seed. It should be noted that, for example, an optimizer can generate the final join selectivity by combining this seed selectivity with similar statistics on a base table which can remain the same across iterations.

In accordance with one embodiment of the invention, a divergence metric can be defined as follows:

$$\text{divergence at S\_i} = \log\left(\frac{\text{seed selectivity of S\_i from feedback}}{\text{seed selectivity of S\_i}}\right)$$

Here, the numerator of the fraction can represent the seed selectivity of iteration i computed based on the feedback collected after the execution of the previous iteration i–1. In other words, the number of unique values and number of rows used to computer this selectivity can be derived from the actual result (or actual statistics) of the previous iteration that can be provided as feedback. The denominator of the fraction can denote the estimated selectivity based on projected number of unique values and number of rows. For example, a divergence value that is close (e.g., within a determined range, 5%, 10%) to zero (0) can indicate that the join selectivity remains close to uniform at the given iteration and the projected or estimated cardinality computed by the optimizer remains valid. A positive divergence can indicate underestimation and while a negative divergence can indicate overestimation.

It should be noted that scaling of the divergence value can be done in a symmetric value using the "log" function as shown above. As another example, another option is to compute divergence by simply using the absolute value of the difference of the two selectivity values (i.e., the estimated selectivity value and actual selectively value). However, this metric will not be able to indicate the relative ratio of the two and hence may be less meaningful. To further elaborate, when the relative ratio of the two values changes in multiples, for example: 0.1/0.1, 0.1/0.2 to 0.1/0.3 and 0.2/0.6, the results of the divergence values are as follows: 0, 0.3, 0.48 and 0.48. However, by simply subtracting the values, the result would be the following: 0, 0.1, 0.2 and 0.4.

It should also be noted that the divergence discussed above can also be provided as a configurable parameter to a database system or DBMS. For example, a divergence value of "0.2" can indicate that the optimizer need not re-plan, as long as the divergence is a positive value or "–0.2." The divergence threshold can also be automatically set, for example, by an optimizer that determines what margin of error can lead to change of plan for a particular iteration.

Figure 5:
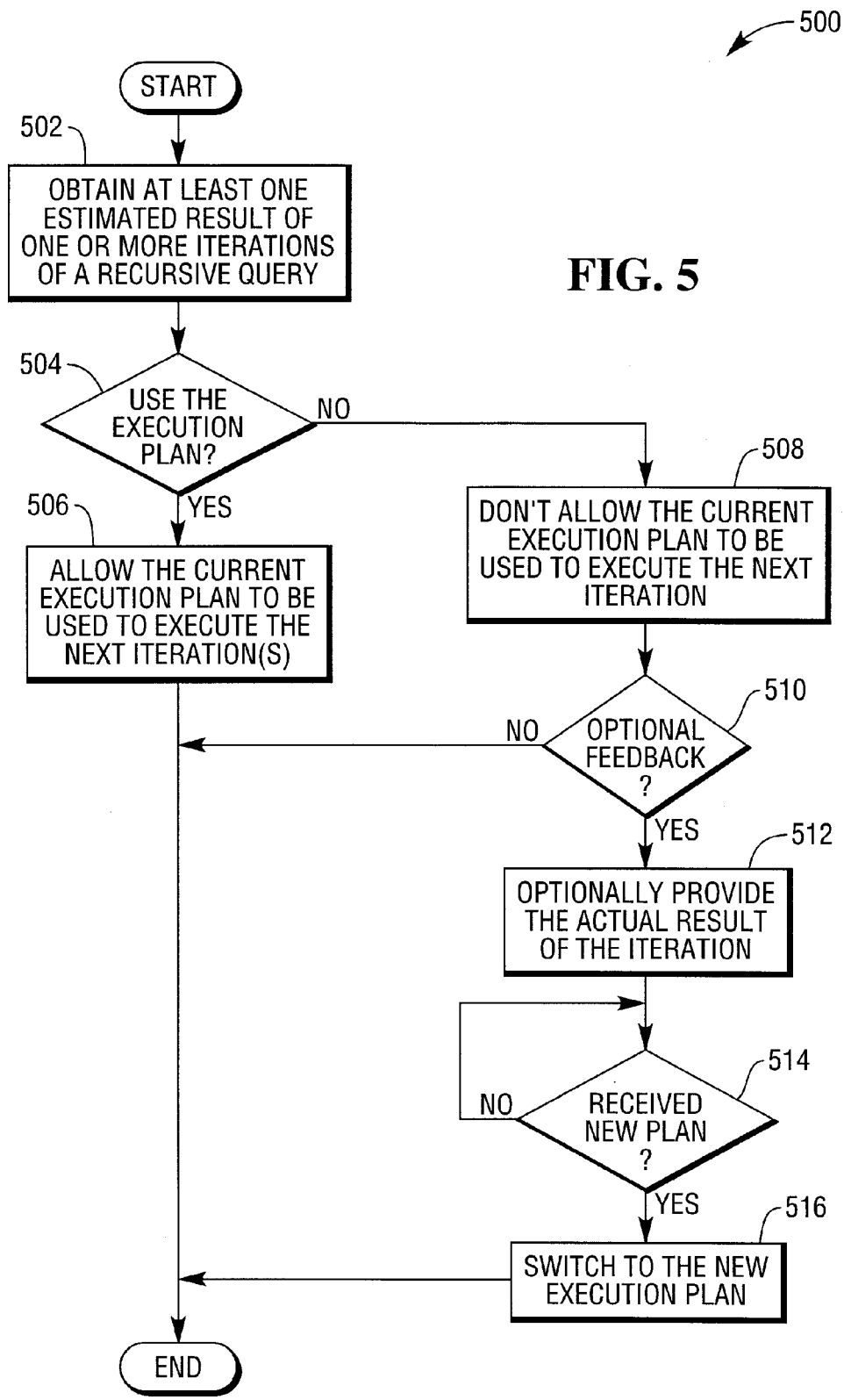
FIG. 5 depicts a method 500 for determining an execution plan for a database query of a database in accordance with one embodiment of the invention.

To elaborate even further, FIG. 5 depicts a method 500 for determining an execution plan for a database query of a database in accordance with one embodiment of the invention. Typically, the database query requires multiple sub-queries to be executed as multiple iterations such that a result of a first one of the sub-queries is needed to be determined in a first iteration of the iterations in order to determine the result of a second one of the sub-quires in a second iteration of the iterations to be performed after the first iteration. Method 500 can, for example, be used by a device and/or the Recursive Query Optimizer (RQO) 102 depicted in FIG. 3.

Referring to FIG. 5, at least one estimated result of a sub-query associated with one or more iterations of a recursive database can be obtained. Next, based on the estimated result, it can be determined (504) whether to use an execution plan (e.g., an execution plan currently assigned) to execute one or more subsequent (or next) iterations of the recursive database query. This determination can, for example, be carried out by using the divergence metric to compare the estimated result(s) with the actual result(s) obtained after the execution of the one or more iterations. As a result, using the execution plan can be allowed (506) before the method 500 ends.

On the other hand, if it is determined (504) based on the divergence metric not to use the execution plan, using the execution plan is denied (508). Optionally, it can be determined (510) whether to provide feedback to re-plan the execution plan. As a result, actual size of result(s) of the iteration(s) can be provided (512), for example, to an optimizer for generation of a new execution plan. Consequently, method 500 can wait (514) to receive a new execution plan and switch (516) to the new execution plan before the method 500 ends. It should be noted that method 500 can be effectively used to process all of the iterations of a recursive database query in the manner discussed above and by repeating the process even though for simplicity the repetition of the process is not shown in FIG. 5.

It should be noted that techniques noted above are especially useful for large database systems, including single or multi-node, parallel database systems. A multi-node parallel database system can, for example, use a massively parallel processing (MPP) architecture or system to perform various database operations in parallel.

Referring to FIG. 6, in a multiprocessing database, an optimizer can produce plans for multiple recursive iterations up-front instead of just one plan for the first iteration in accordance with one embodiment of the invention. The resulting plans can be sent by a dispatcher to processing units (or data-parallel execution units shown as AMPs, for example of the Teradata MPP DBMS). The processing units can either send back feedback after k iterations or an empty seed if the recursion has finished at that AMP. The recursive query finishes when all AMPs return an empty seed. In addition to generating better plans, this approach allows the optimizer to consider both pipelining and global query optimizations by making the k plans available. The above approach can requires projected estimates of demographics at the different iterations to produce the appropriate plan at each iteration of a recursive database query.

Figure 7:
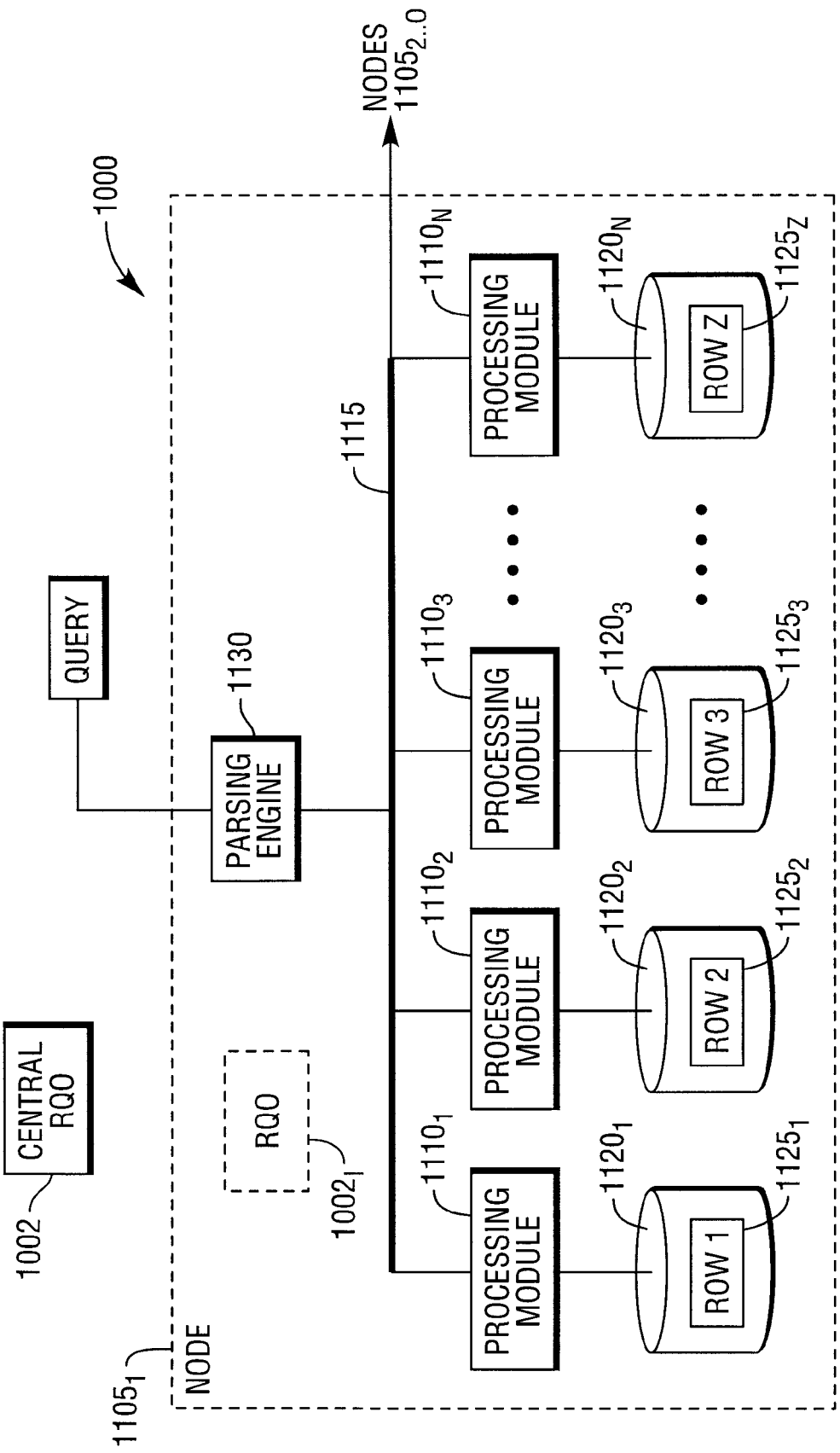
FIG. 7 depicts a database node 1105 of a database system or a Database Management System (DBMS) 1000 in accordance with one embodiment of the invention.

To further elaborate, FIG. 7 depicts a database node 1105 of a database system or a Database Management System (DBMS) 1000 in accordance with one embodiment of the invention. The DBMS 1000 can, for example, be provided as a Teradata Active Data Warehousing System. It should be noted that FIG. 5 depicts in greater detail an exemplary architecture for one database node 1105$_1$ of the DBMS 1000 in accordance with one embodiment of the invention.

Referring to FIG. 5, the DBMS node 1105$_1$ includes multiple processing units (or processing modules) 1110-N connected by a network 1115, that manage the storage and retrieval of data in data-storage facilities 1120$_{1-N}$. Each of the processing units 1110-N can represent one or more physical processors or virtual processors, with one or more virtual processors (e.g., an Access Module Processer (AMP)) running on one or more physical processors in a Teradata Active Data Warehousing System). For example, when provided as AMPs, each AMP can receive work steps from a parsing engine (PE) 1130 which is also described below.

In the case in which one or more virtual processors are running on a single physical processor, the single physical processor swaps between the set of N virtual processors. For the case in which N virtual processors are running on an M-processor node, the node's operating system can schedule the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing units 1110$_{1-N}$ can manage a portion of a database stored in a corresponding one of the data-storage facilities 1120$_{1-N}$. Also, each of the data-storage facilities 1120$_{1-N}$ can include one or more storage devices (e.g., disk drives). Again, it should be noted that the DBMS 1000 may include additional database nodes 1105$_{2-O}$ in addition to the database node 1105$_1$. The additional database nodes 1105$_{2-O}$ can be connected by extending the network 1115. Data can be stored in one or more tables in the data-storage facilities 1120$_{1-N}$. The rows 1125$_{1-z}$ of the tables can, for example, be stored across multiple data-storage facilities 1120$_{1-N}$ to ensure that workload is distributed evenly across the processing units 1110$_{1-N}$. In addition, a parsing engine 1130 can organize the storage of data and the distribution of table rows 1125$_{1-z}$ among the processing units 1110$_{1-N}$. The parsing engine 1130 can also coordinate the retrieval of data from the data-storage facilities 1120$_{1-N}$ in response to queries received, for example, from a user. The DBMS 1000 usually receives queries and commands to build tables in a standard format, such as, for example, SQL. Parsing engine 1130 can also handle logons, as well as parsing the SQL requests from users, turning them into a series of work steps that can be sent to be executed by the processing units 1110$_{1-N}$.

For example, a client-side Host 1004 (e.g., a Personal Computer (PC), a server) can, be used to logon to the database system 1000 provided as a Teradata DBS server. Commination between the client-side Host 1004 and the database system 1000 can be facilitated by a database communicating mechanism, for example, by an ANSI CLI (Call Level Interface) standard that can include parcel requests and responses that facilitate the movement of files resident on the client-side host 1004 over to the database system 1000.

For example, the rows 1125$_{1-z}$ can be distributed across the data-storage facilities 1120$_{1-N}$ by the parsing engine 1130 in accordance with their primary index. The primary index defines the columns of the rows that are used for calculating a hash value. The function that produces the hash value from the values in the columns specified by the primary index may be called the hash function. Some portion, possibly the entirety, of the hash value can be designated a "hash bucket". As such, the hash buckets can be assigned to data-storage facilities 1120$_{1-N}$ and associated processing units 1110$_{1-N}$ by a hash bucket map. The characteristics of the columns chosen for the primary index determine how evenly the rows are distributed.

Referring again to FIG. 7, it should be noted that a Recursive Query Optimizer (RQO) 1002 can be provided for the database node 1105$_1$. The RQO 1002 can be act as a central component. However, it should be noted that each one of the processing units 1110$_{1-N}$ can be effectively provided with a local Optimizer (RQO) 1002$_{1-N}$ that can serve as a local component and possibly collaborate with the RQO 1002. Of course, various other configuration are possible and will become readily apparent in view of the foregoing.

Techniques for optimization of recursive or iterative database queries are described in patent application Ser. No. 13/721,901 entitled CARDINALITY ESTIMATION FOR OPTIMIZATION OF RECURSIVE OR ITERATIVE DATABASE QUERIES BY DATABASES," which is hereby incorporated by reference herein in its entirety and for all purposes.

Techniques for optimization of recursive or iterative database queries are also described in patent application Ser. No. 13/722,133 entitled "ESTIMATING NUMBER OF ITERATIONS OR SELF JOINS REQUIRED TO EVALUATE ITERATIVE OR RECURSIVE DATABASE QUERIES," which is hereby incorporated by reference herein in its entirety and for all purposes.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method, implemented at least partly by a device, for facilitating execution of a database query of a database, wherein the database query requires multiple sub-queries to be executed as multiple iterations such that a result of a first one of the sub-queries is needed to be determined in a first iteration of the iterations in order to determine the result of a second one of the sub-queries in a second iteration of the iterations to be performed after the first iteration, and wherein the method comprises:

determining, at least partly based on (i) a predicted result of the first one of the sub-queries, and (ii) determining whether an actual result of the first one of the sub-queries obtained by executing the first iteration differs or diverges more than a determined value from an estimated result of first one of the sub-queries, whether to use a first execution plan to execute the second iteration to determine the result of the second one of the sub-queries of the database query, wherein the estimated result of the first one of the sub-queries is determined based on a predicted seed selectively of the first sub-query that represents a ratio of rows that a join with at least one table of the database would produce given a first iteration seed provided as input of the first sub-query; and not allowing the first execution plan to be used to execute the second iteration when the determining determines not to use the current execution plan to execute the second iteration.

2. The method of claim 1, wherein the method further comprises: facilitating execution of the second iteration using a second execution plan that is different than the first execution plan when the determining determines not to use the first execution plan to execute the second iteration.

3. The method of claim 2, wherein the method further comprises: providing optimization data, that includes data associated with the result of the first one of the sub-queries obtained by executing the first sub-query in the first iteration, to an optimizer when determining determines not to use the first execution plan to execute the second iteration; and thereafter, obtaining the second execution plan from the optimizer for executing the second iteration.

4. The method of claim 1, wherein the method further comprises: providing the actual result of the execution of the first iteration to an optimizer for generation of a second execution plan when the determining determines not to use the first execution plan to execute the second iteration.

5. The method of claim 4, wherein the providing provides the result in a feedback loop.

6. The method of claim 1, wherein the method further comprises: generating a second execution plan that is different than the first execution plan at least partly based on optimization data that includes data associated with the result of the first one of the sub-queries.

7. The method of claim 6, wherein the result of the first one of the sub-queries includes one or more sizes of one or more tables of the database involved in the first sub-query.

8. The method of claim 1, wherein the predicted seed selectively of the first sub-query is determined by dividing, the number of unique values in one or more recursive join conditions of the database query, by the total number of rows in one or more tables involved in at least one recursive join of the first iteration.

9. A device that includes one or more processors configured to:

determine, at least partly based on (i) a predicted result of first one of the sub-queries a database query of a database, and (ii) determining whether an actual result of the first one of the sub-queries obtained by executing the first iteration differs or diverges more than a determined value from an estimated result of first one of the sub-queries, whether to use a first execution plan to execute a second iteration of the sub-queries of the database query, wherein the database query requires the sub-queries to be executed as multiple iterations, such that a result of the first one of the sub-queries is needed to be determined in the first iteration of the iterations in order to determine the result of a second one of the sub-queries in the second iteration of the iterations to be performed after the first iteration, wherein the estimated result of the first one of the sub-queries is determined based on a predicted seed selectively of the first sub-query that represents a ratio of rows that a join with at least one table of the database would produce given a first iteration seed provided as input of the first sub-query; and not allow the first execution plan to be used to execute the second iteration when the determining determines not to use the first execution plan to execute the second iteration.

10. A non-transient computer readable storage medium storing at least executable code for facilitating execution of a database query of a database, wherein the database query requires multiple sub-queries to be executed as multiple iterations such that a result of a first one of the sub-queries is needed to be determined in a first iteration of the iterations in order to determine the result of a second one of the sub-queries in a second iteration of the iterations to be performed after the first iteration, and wherein the executable code includes:

executable code for determining, at least partly based on fi) a predicted result of the first one of the sub-queries, and (ii) determining whether an actual result of the first one of the sub-queries obtained by executing the first iteration differs or diverges more than a determined value from an estimated result of first one of the sub-queries whether to use a first execution plan to execute the second iteration to determine the result of the second one of the sub-queries of the database query, wherein the estimated result of the first one of the sub-queries is determined based on a predicted seed selectively of the first sub-query that represents a ratio of rows that a join with at least one table of the database would produce given a first iteration seed provided as input of the first sub-query; and executable code for not allowing the first execution plan to be used to execute the second iteration when it is determined not to use the current execution plan to execute the second iteration.

* * * * *